United States Patent [19]

Takamura et al.

[11] Patent Number: 5,678,773
[45] Date of Patent: Oct. 21, 1997

[54] WASTE PROCESSING METHOD AND APPARATUS THEREFOR

[75] Inventors: Yoshiyuki Takamura, Kudamatsu; Masakatsu Hayashi, Ushiku; Tsutomu Hasegawa, Niiza, all of Japan

[73] Assignee: Hitachi, Ltd., Tokyo, Japan

[21] Appl. No.: 414,643

[22] Filed: Apr. 3, 1995

Related U.S. Application Data

[63] Continuation-in-part of Ser. No. 250,777, May 27, 1994, which is a continuation-in-part of Ser. No. 85,092, Jul. 2, 1993, Pat. No. 5,431,347, which is a continuation-in-part of Ser. No. 56,937, May 5, 1993, Pat. No. 5,301,881, which is a continuation of Ser. No. 984,492, Dec. 2, 1992, abandoned.

[30] Foreign Application Priority Data

| Dec. 2, 1991 | [JP] | Japan | 3/317643 |
| Jan. 29, 1993 | [JP] | Japan | 5/13385 |
| May 27, 1993 | [JP] | Japan | 5-125670 |
| Dec. 28, 1993 | [JP] | Japan | 5-334960 |
| Feb. 24, 1994 | [JP] | Japan | 6-26461 |
| Feb. 24, 1994 | [JP] | Japan | 6-26464 |
| Sep. 20, 1994 | [JP] | Japan | 6/224781 |

[51] Int. Cl.$^6$ .................................................. B02C 19/12
[52] U.S. Cl. ................... 241/23; 241/24.13; 241/29; 241/189.1; 241/193; 241/DIG. 38
[58] Field of Search ................... 241/DIG. 37, DIG. 38, 241/14, 73, 189.1, 23, 193, 29, 24.13, 24.14, 24.15

[56] References Cited

U.S. PATENT DOCUMENTS

| 3,603,514 | 9/1971 | Williams | 241/DIG. 38 X |
| 4,020,992 | 5/1977 | Binger et al. | 241/DIG. 38 X |
| 5,297,741 | 3/1994 | Zurn et al. | 241/DIG. 38 X |
| 5,301,881 | 4/1994 | Hayashi et al. | |
| 5,431,347 | 7/1995 | Hayashi et al. | |

FOREIGN PATENT DOCUMENTS

| A1304677 | of 1962 | France. |
| 3905610C1 | 9/1990 | Germany. |
| 3942302A1 | 6/1991 | Germany. |
| 4240389A1 | 6/1993 | Germany. |

Primary Examiner—Mark Rosenbaum
Attorney, Agent, or Firm—Evenson McKeown Edwards & Lenahan, PLLC

[57] ABSTRACT

To provide a high-efficient apparatus for minimizing the volume of dust to be buried in the ground or processed in incineration process by crushing a waste article such as wasted electric appliances, separating an individual material component, and discriminating and extracting valuable resources. Motor and other waste articles separated at a metallic lump separation station are cooled down by a cooling apparatus, and put into a soft crushing apparatus where articles are crushed at low temperature. After the residual articles, including housing and so on are crushed primarily by the coarse crushing apparatus, they are forwarded to the soft crushing apparatus. The coarse crushing apparatus mainly supplies the shear action and, on the other hand, the soft crushing apparatus uses a mixed and integrated mechanical interaction other than shear action including compression, friction, twist and distortion actions, which results that a composite material structure is broken down and separated into individual material components and that those material components are processed by individual materials in the later process done by the metallic material separation apparatus and the plastic material separation apparatus. Almost all parts of the large-size waste article can be recovered and used for recycle resources as well as the volume of dust composed of small-size particles can be minimized.

15 Claims, 7 Drawing Sheets

WASTE PROCESSING METHOD AND APPARATUS THEREFOR

BACKGROUND AND SUMMARY OF THE INVENTION

This is a Continuation-in-Part (CIP) application of application Ser. No. 08/250,777, filed May 27, 1994, which is a CIP of application Ser. No. 08/085,092, filed Jul. 2, 1993, now U.S. Pat. No. 5,431,347 issued Jul. 11, 1995 which is a CIP of application Ser. No. 08/056,937, filed May 5, 1993, and now U.S. Pat. No. 5,301,881, which is a continuation of application Ser. No. 07/984,492, filed Dec. 2, 1992, now abandoned.

The present invention relates to industrial waste processing methods and apparatus. More specifically, the present invention relates to recycling systems for large-sized items such as used home electrical appliances, wherein crushing of the appliance is used as part of the recycling process.

Conventional processing of such large-sized items have mostly involved burying the articles directly in the ground. In some cases, the appliances or parts thereof are crushed and incinerated before being buried. In particular cases, valuable parts of the appliances, including non-metallic materials, are disassembled and collected from the appliances, mostly with manual labor. However, the major volume of plastic part components of appliances are not effectively collected, but directly buried in the ground or incinerated. The burying of plastic materials in the ground makes the ground soft and unstable in a geological sense, thereby limiting the effective use of this method. In addition, in the case of incinerating plastic materials including chemical compounds leading to the generation of harmful gases such as chloride gas, air pollution control procedures are necessary and problems arise due to carbonic acid gas generation and consequent global warming problems.

A system has been proposed for separation and recovery of metallic materials from appliances by reducing the overall size of the appliance and by separation of materials including copper. In this system, a used or junk car is conveyed to a shredder machine where the car is broken down into crushed pieces. These crushed pieces are conveyed to a dust catcher where the individual pieces are separated into two categories namely: heavyweight pieces and lightweight pieces. The overall volume of the lightweight pieces are reduced by incinerating the flammable components thereof in an incinerator, resulting in reduction of the volume to be eventually buried in the ground. The incombustible components discharged from the incinerator are separated by a sifter into different grain-sized categories. These incombustible materials are transported to a metal discrimination recovery apparatus which uses magnets to separate ferromagnetic materials and nonmagnetic materials. Next, the nonmagnetic materials are sorted into large sized grain articles and small sized grain articles by a vibration sifter or shifter. From the large sized articles, an eddy-current discrimination device sorts the aluminum pieces and other nonmagnetic articles, including copper. The copper articles and lower density materials are collected by a hydrometric fluid discrimination apparatus.

In Japanese published patent application number 147040 (1993) and corresponding above-mentioned U.S. Pat. No. 5,301,881, a recycling system is proposed for separating, recovering and recycling of the valuable material components, including metallic materials and plastic materials. This system also proposes to reduce the land reclamation requirements by limiting the volume of materials that need to be buried, while also limiting the incinerator processing.

In previously proposed recycling systems, crushing machines are used which include a high-speed rotation shock type crusher or hammer mill. Such crushing equipment has been popularly used and modified from the field of ore mining, dressing and refining, such as in coal mining. In these systems, a crushing device is utilized with a cutter bar fixed at a position close to a collision board or crash plate which faces the hammers on the hammer mill. In this arrangement, relatively flexible and soft materials may be crushed by shear forces developed between the hammer and the cutter bar. In these conventional crushing devices, a major purpose is to reduce the volume of the waste articles by crushing them and shearing or cutting them to form small particles, but the recovery of valuable metallic materials is given a second priority. The mechanical function of crushing with such devices is to break down articles directly into smaller pieces, relying substantially on mechanical shear forces. With such a system, the crushed articles containing flexible and soft materials such as natural or artificial fibers and plastics, can be smoothly extracted. However, the composite materials are not separated in the pieces discharged from the crushing hammer mill, and therefore the efficiency of the separation and recovery in downstream processes is not improved.

An object of the present invention is to provide a recycling system which results in an increased recovery efficiency of valuable components of the appliances being recycled. Another object of the present invention is to minimize the volume of waste products that need to be disposed of after extracting and collecting the valuable materials.

According to one aspect of the present invention, these objects are achieved by utilizing a "soft" crushing system and method which relies on forces other than shearing forces to crush the appliances and appliance components. In the soft crushing contemplated by the invention, tension is applied parallel to attachment planes of plastic material on metal parts and the like. In this manner, the crushing process not only subdivides the articles into small components, it also assists in actual separation of the plastic and metal components from one another. Also, with the soft crushing techniques according to the invention, the amount of dust or small size particles that cannot be recycled is substantially reduced, thereby reducing requirements for disposition of such material.

In especially preferred embodiments, the present invention also contemplates cooling of certain of the components from the appliances prior to crushing so that the same can be crushed with low-intensity shock because of the lower temperature brittleness characteristics.

In preferred embodiments of the invention applied to processing electric home appliances such as refrigerators, the refrigerator is first subjected to a pre-processing step where the refrigerant (for example, chlorofluorohydrocarbon fluid) is discharged from the used refrigerator. Next, the refrigerator compressor is removed by a metallic lump separator. The housing body of the refrigerator is then crushed coarsely into relatively large sizes by a crusher which relies substantially upon shearing forces. Subsequently, the refrigerator housing body components are crushed softly under controlled conditions. Subsequently, each part from the soft crushing apparatus is then sorted by its specific material.

The compressor of the refrigerator which was removed (similarly to motors and transformers used generally in various electric appliances) is formed as a metallic compound lump having higher stiffness in which metallic steel plates are laminated in layers; copper wires are used for coils; and relatively thick steel plates and shafts are used. Therefore, it is difficult to brush this metallic compound lump at room temperature to separate the individual materials. According to the invention, it is effective to crush these articles at lower temperature by utilizing the fact that the material brittleness characteristics at low temperature make them more easy to fracture like glass with less stress than in a higher or room temperature environment. By applying low temperature crushing, metallic articles including iron, copper, aluminum and so on shaped in plate, bar, wire and block can be crushed and separated so as to therefore facilitate later separation of metallic materials from mixed articles in subsequent process steps. This low temperature brittle temperature, defined as the threshold temperature under which the material loses its stiffness and gets more brittle, is a function of the material composition as well as its thickness and shape, and is generally below −100° C.

Although some of the non-ferrous metals such as copper and aluminum do not have low temperature brittle characteristics, they can be treated together with components such as compressors containing copper as well as steel components subject to low temperature brittle characteristics- In especially preferred embodiments, the metallic lump which is cooled below the designated critical temperature for the low-temperature brittle process is also fed to the soft-crushing device, to be there finally crushed in the low-temperature process. The metallic and nonmetallic materials from this soft crush process can be efficiently separated and collected. The plastic material not crushed into pieces such as vinyl chloride plastic resin and polyolefin plastic resin is also efficiently separated and collected.

Other objects, advantages and novel features of the present invention will become apparent from the following detailed description of the invention when considered in conjunction with the accompanying drawings.

DETAILED DESCRIPTION OF THE DRAWINGS

Figure 1:
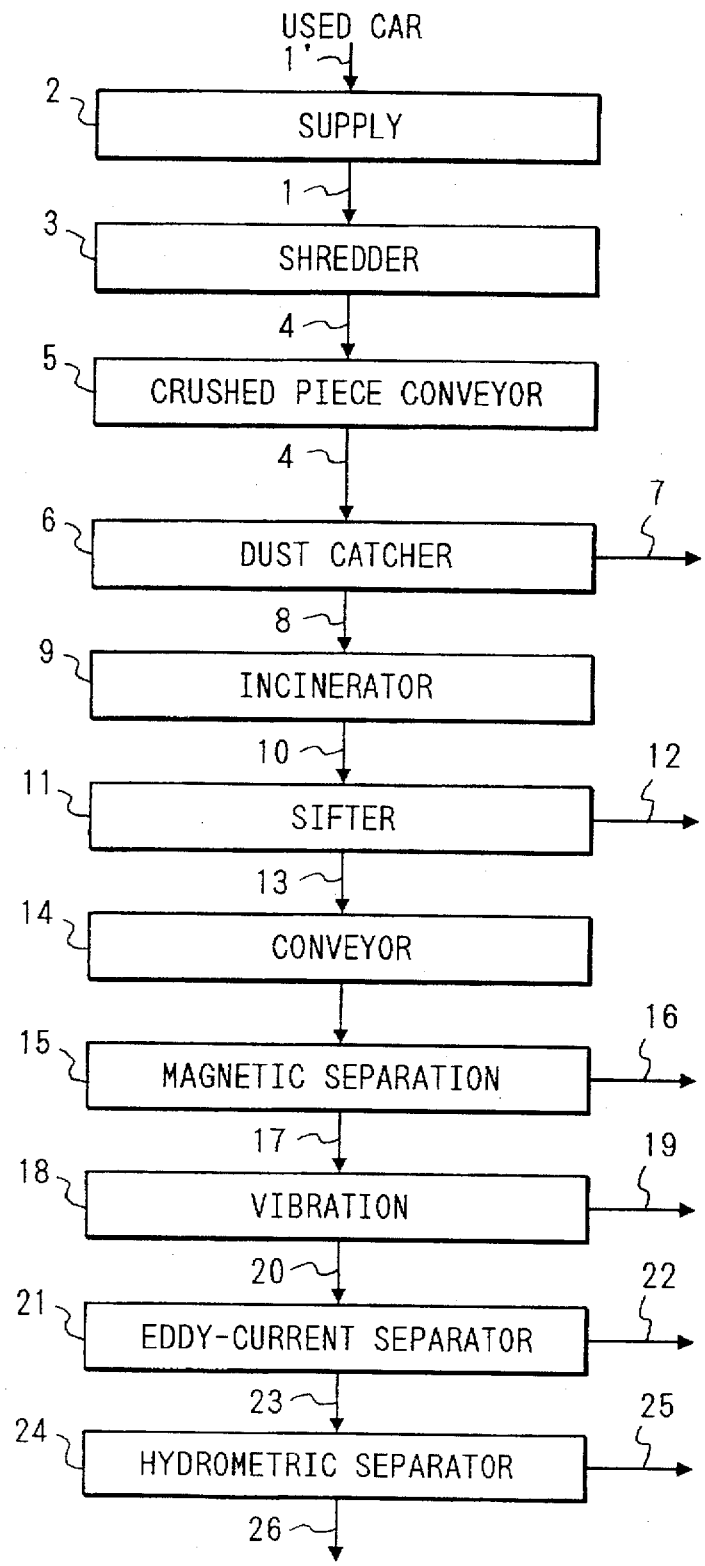
FIG. 1 is a flow diagram depicting a recycling process in accordance with the prior art.

FIG. 1 illustrates a prior art recycling process for a used or junk car 1 which is transported by a conveyor 2 to a shredder machine 3 where the car is shredded into pieces 4. The pieces 4 are conveyed by a crushed piece conveyor 5 to a dust catcher 6. In the dust catcher 6, the individual pieces of the crushed pieces 4 are separated into two categories: heavyweight pieces 7 and light weight pieces 8. The overall volume of the light weight pieces 8 is reduced by incineration in the incinerator 9. The incombustible components 10 discharged from the incinerator 9 are separated by a sifter 11 into two categories 12 and 13. The incombustible materials 13 are conveyed by conveyor 14 to a metal discrimination recovery device 15 which uses magnets to separate ferromagnetic materials 16 and nonmagnetic materials 17. The nonmagnetic materials 17 are sorted at vibration sorter 18 into small-size articles or particles 19 and large grain size particles 20. The large size grain particles 20 are fed to an eddy current discrimination device 21 for sorting out aluminum pieces 22 and other nonmagnetic pieces 23, including copper. The particles 23 are fed to a hydro-metric fluid discrimination apparatus 24 for separating the copper articles 2 on a 5 and lower density materials 26.

Figure 2:
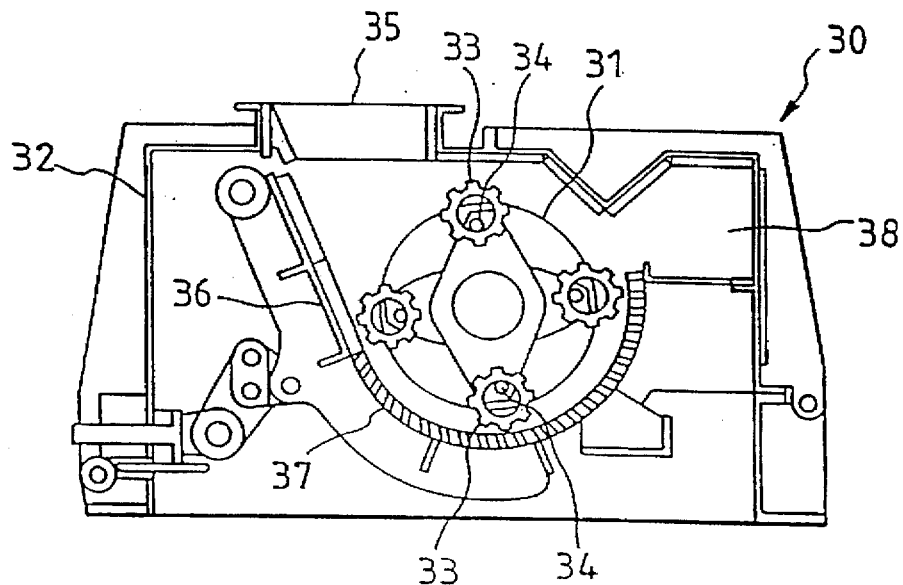
FIG. 2 is a sectional schematic view of a crushing apparatus of rotation shock type used in the prior art.

FIG. 2 illustrates an exemplary crushing machine of the prior art. In FIG. 2, a high-speed rotation shock type crusher or hammer mill 30 is shown. Mill 30 includes a rotor assembly 31 which is drivingly rotated inside of a casing 32. A plurality of hammers 33, rotatable with the rotor assembly 31, are movable in the radial direction of the rotor assembly 31 by centrifugal force during operations. Each hammer 33 is mounted on a hammer rod 34. A hammer rod will extend through several axially spaced hammers. As the rotor assembly 31 rotates with increasing speed, edge blades of the individual hammers 33 reach radially outwardly to engage material parts supplied into the input port 35 to break and crush these parts by interaction between the hammers 33. A collision board 36 is fixed at the casing 32, and the articles supplied from the input port 35 collide with the hammers 33, rebound and furthermore, collide with the collision board so as to be finally crushed.

A grate 37 functions to sort and filter small-sized particles and to facilitate breaking of parts or particles into smaller sized units by pressing force as well as friction force. These smaller sized crushed particles drop down through the gap between adjacent segments of the grate 37 and are discharged as crushed flakes at the outlet 37A. Larger size particles which cannot pass through the grate rotate again with the rotor 31 and the crushing action is repeated again at the lower part of the input opening 35. An extra-size article pocket 38 is provided for accepting particles which cannot be crushed. These particles from pocket 38 are dischargeable continuously or intermittently.

The type of crushing apparatus illustrated in FIG. 2 has been popularly used and modified from the field of ore mining, dressing and refining, such as in coal mining. In operation for use in crushing home appliances such as refrigerators and the like, a cutter bar is fixed at a position close to the collision board 36, where the collision board 36 and the hammers 33 come close together at each rotation, so that relatively flexible and soft materials may be subdivided by shear forces developed between the hammers and the cutter bar. In the conventional crushing devices for large sized industrial and household wastes, the major purpose is to reduce the volume of the waste articles by crushing them into smaller pieces, and the recovery of valuable metallic materials is given second priority. The mechanical function of crushing relies on the mechanical interactive actions between the hammers 33 and the grate 37, namely: collision, screw, shear and compression forces, and to discharge forcibly the small-size crushed pieces through the slits at the grate 37. Accordingly, crushed pieces containing flexible and soft material such as natural and artificial fibers and plastics can be extracted smoothly, but the composite materials are not separated in the discharged articles, and therefore the efficiency of the separation and recovery in the downstream processes cannot be improved, and especially the separation and recovery of the articles containing the flexible and soft materials cannot be realized.

Figure 3A:
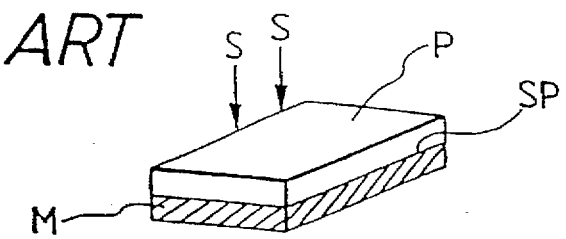
FIG. 3A is a diagram showing the forces acting on a home appliance composite component of plastic and metal when acted on by a shearing type crusher of the type contemplated by the prior art.

FIG. 3A schematically depicts the types of forces acting on composite components when crushed in a crusher such as the crusher of FIG. 2. In the sectional view illustrated, the plastic P coated onto the metallic part M is separated into smaller pieces by shear forces S which cut the component and form smaller pieces. There are only chance or random small instances of forces acting parallel to the separation plane SP between the plastic P and metal M. Consequently, there is no effective starting of the separation of metal and plastic during the crushing stages.

With prior art systems of the type described using high shearing in the crusher to reduce the particle sizes, it is difficult to get good separation of plastic and metal and consequent high recovery rates for particle sizes smaller than 30 mm in mean diameter. Also, there is a high proportion of recyclable dust due to the low separation and recovery on these smaller size particle sizes under 30 mm in mean diameter.

Figure 3B:
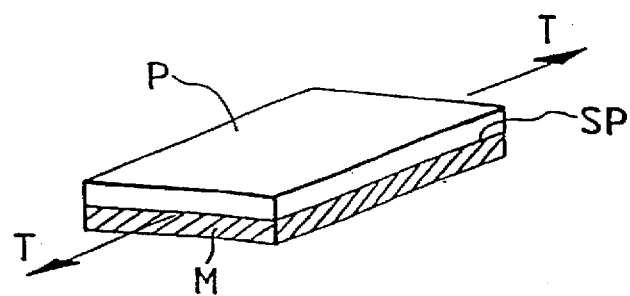
FIG. 3B is a schematic diagram similar to FIG. 3A, but showing the forces acting when using a soft crushing arrangement according to the present invention.

FIG. 3B schematically depicts the forces acting on a composite plastic and metal component part when subjected to soft crushing as contemplated by the present invention. Shearing forces are minimized in directions perpendicular to the separation plane SP, but the tension forces T parallel to the separation plane SP serve to facilitate separation and partial separation of the plastic P and metal M during the crushing process. This soft crushing action of the present invention leads to improved downstream process separation for all sizes down to 5 mm in mean diameter. Consequently, the amount of unrecyclable dust is substantially reduced and the total recovery is substantially improved. Also, recycling total energy requirements for recycling are substantially reduced.

By using the recycling system and method of the present invention utilizing soft crushing, at least 90% of the material size output from the soft crusher has a recyclable material size greater than 5 mm diameter. Due to the separation and partial separation of metal and plastic (and other soft material like insulation fibers, etc.) in the crusher, downstream separation processes are substantially improved so they are effective even on parts as small as 5 mm in mean diameter. Thus, at least 90% of the material is separated with a purity of greater than 90%, thereby facilitating corresponding high recycling percentages. In contrast thereto, with the prior art crusher relying primarily only on shearing as described above, only about 70% of the material has a recyclable size of greater than 30 mm diameter. Since the shearing action does not separate or partially separate the metal and plastics (and other soft materials like insulation fibers, etc.), only sizes larger than 30 mm mean diameter can be effectively separated and recycled in downstream processes by the crusher. Thus, only about 70% of the total material weight is in a form facilitating the downstream recycling processes. Thus, the weight percentage of materials that are effectively recycled is substantially greater using the present invention.

Figure 4:
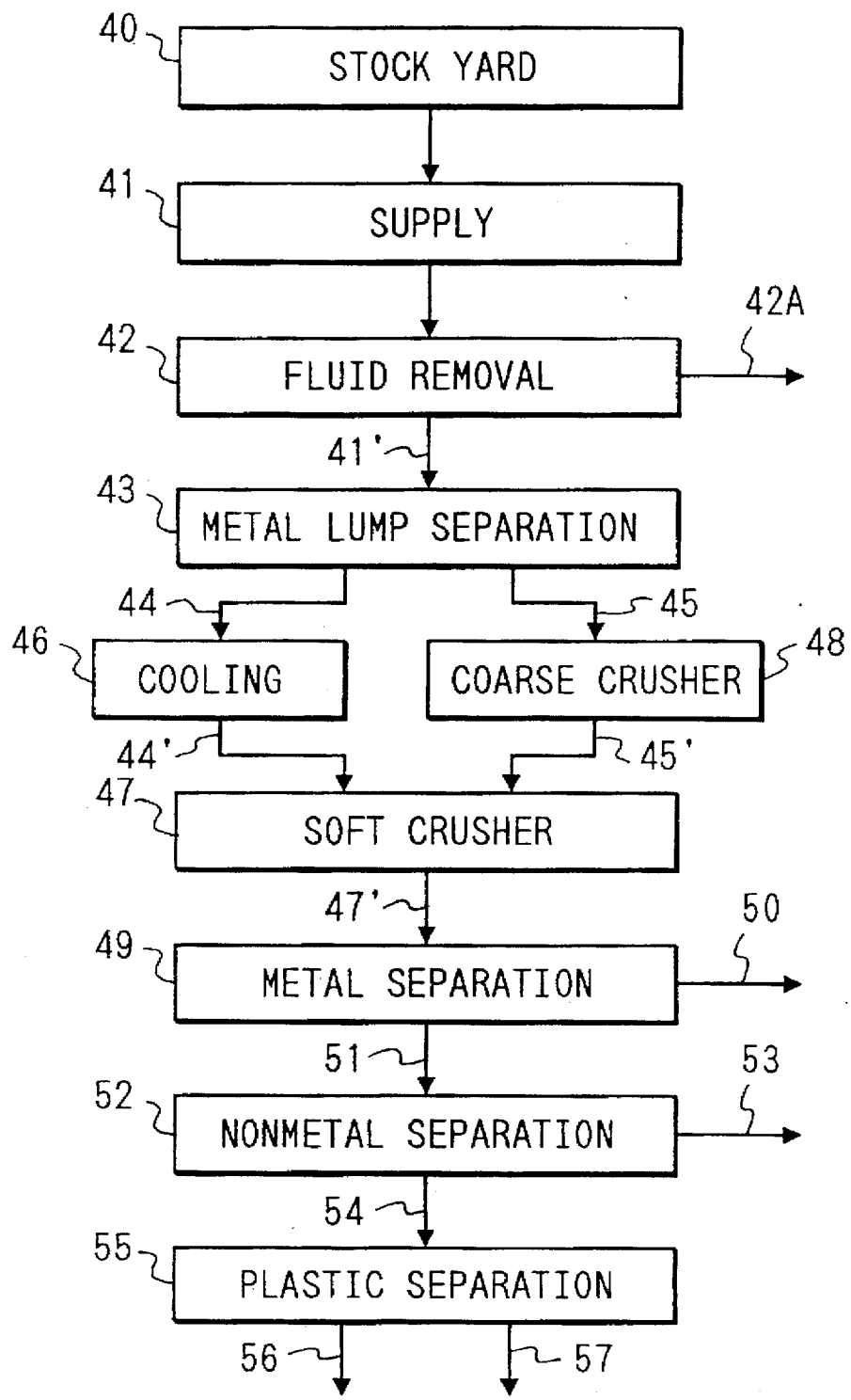
FIG. 4 is a flow diagram depicting a recycling process according to an embodiment of the present invention.

FIG. 4 is a flow diagram showing the system and method of recycling according to a preferred embodiment of the present invention. A stock yard or storage facility 40 is provided for waste articles, including home appliances such as refrigerators, washing machines, television sets, air-conditioners and the like. These used or junk electric home appliances are collected by garbage collection trucks or the like and brought to the supply or stock yard 40 to be processed. A supply device or conveyor 41 transfers the appliances to a pre-processing station 42. At pre-processing station 42, preliminary processing is conducted such as refrigerant recovery depicted by arrow 42A. For example, the refrigerant is drained from the home appliance at station 42, prior to any major dismantling or breaking down of the appliance into particles or components. The appliances are then transferred to station 43, which is a metallic lump separation station. At this station 43, major metallic lump parts, such as compressors for refrigerators, electric motors for refrigerators or other appliances, and the like, are removed as metallic lumps depicted at 44 to be conveyed to a cooling apparatus described below. The remaining components of the appliance, such as the insulated refrigeration casing composed of adhered-together metallic and non-metallic parts, such as plastic, are supplied to the coarse crushing apparatus as major components, indicated by arrow 45.

A cooling station 46 is provided for cooling the metallic lump components 44 (compressors, motors and the like) so as to improve their brittleness characteristics for the subsequent soft crushing process. These metallic lump parts 44 are cooled at the cooling station 46 to temperatures of 100° C. below zero and colder, and then these cooled parts are supplied as parts 44' to the soft crushing station 47.

Those composite components indicated by arrow 45 are supplied to a coarse crushing station 48 where they are coarse crushed to form relatively large components on the order of 50 mm to 160 mm mean diameter. These coarse crushed parts are depicted at the outlet arrow 45' and supplied to the soft crushing station 47. The cooled metallic lumps 44' and the coarse crushed particle 45' are then supplied to the soft crushing apparatus 47 where they are "soft" crushed into particle sizes between 5 mm and 16 mm mean diameter. The coarse crushed components 45', in the case of a refrigerator being processed, would comprise the thin steel wall forming the outside housing body of the refrigerator, the inner resin boards, the foamed and molded substance used as the thermal insulators, the inner shell and walls, the heat radiator made of aluminum, and other parts.

The cooled metallic lumps 44' are also crushed in the soft crushing station with application of low intensity shock again to form crushed articles having a minimum mean diameter dimension of about 5 mm.

In the soft crushing station, the details of which are described below for preferred embodiments, the small percentage of particles crushed to a mean diameter smaller than 5 mm is separated out and disposed of as dust which is not economically recyclable and which is disposed of by the subsequent incineration, in some instances, and eventual burying in the ground as landfill. In preferred embodiments, the soft crushing at station 47 is carried out at different times for the lump materials from the cooling station 47 and for the composite coarse crushed materials 45'.

Due to the soft crushing forces operating to aid in the separation of different material components, such as plastic coated on metal, the later separation processes are facilitated and the total percentage of recoverable weight of the appliance being processed is substantially increased as compared to prior art arrangements not using the soft crushing technique. The mixture of soft crushed material is designated by arrow 47' and is supplied to a metallic material separation station 49. In the metallic material discrimination and separation station 49, ferrous materials are separated by magnetic devices and subsequently non-ferrous metals such as copper, aluminum and others are separated, the metallic materials being indicated by arrow 50. The remaining non-metallic material is indicated by arrow 51 and is supplied to a non-metallic material separation station 52. In this non-metallic separation and recovery station 52, material such as small sized particles of sand and glass, as well as light weight combustibles are separated and recovered as shown by the arrow 53. The residual particles after this recovery process mainly contain plastic materials and are indicated by arrow 54. These crushed plastic materials are supplied to a plastic material separation station 55, at which station the plastic materials composed of vinyl chloride are separated and indicated by the outlet arrow 56 and the residual plastic materials are separately recovered and indicated by the arrow 57.

Since certain of the processing stages depicted in FIG. 4 represent conventional material recycling stations, such as the stations 49, 52 and 55, further details of such are not included herein in order not to obscure the present invention. For example, the above mentioned U.S. Pat. No. 5,301,881 describes a method of low temperature crushing separation. It should be understood, however, that because of the improved process steps and apparatus related to the soft crushing apparatus and, in preferred embodiments, the combination with the cooling apparatus for the metallic lump parts, the effective recovery yield at these stations 49, 52 and 55 are substantially improved as compared to prior art systems.

Figure 5:
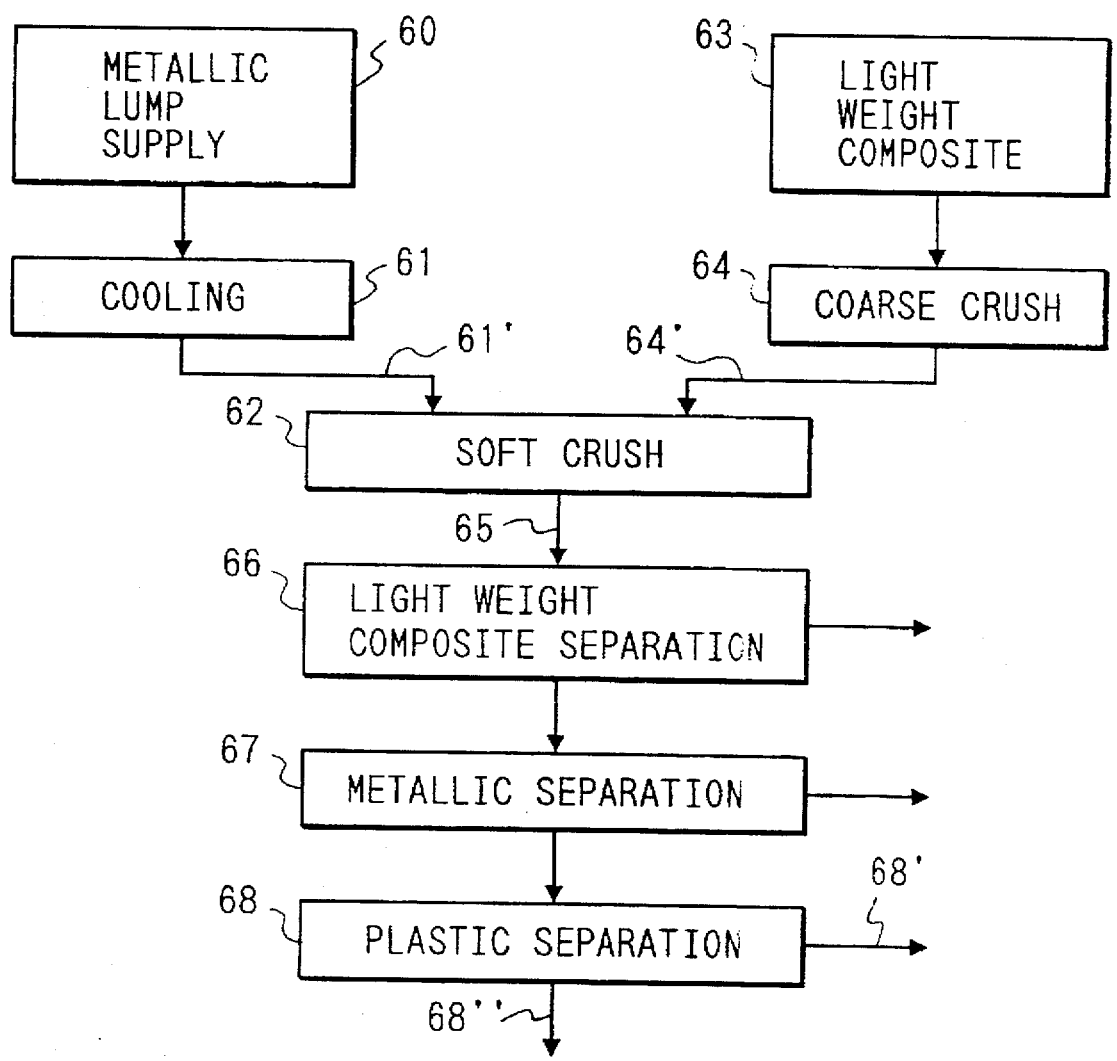
FIG. 5 is a flow diagram of a portion of a recycling process according to another embodiment of the present invention.

FIG. 5 is a flow diagram depicting a system and apparatus of a portion of the recycling system according to another embodiment of the present invention. This particular embodiment reflected in FIG. 5 is particularly effective for the case that the waste articles are separated previously into two categories, namely: light-weight flexible composite materials to which a crushing process at room temperature is effectively applicable, and metallic composite stiffness lump materials to which the crushing process in lower temperatures is particularly effective. Examples of metallic composite stiffness lump materials include compressors using the refrigerator and air-conditioner, motors used in washing machines, electric transformers, microwave ovens, dynamos used for automobiles, electric components molded by rubber and plastic materials, which metallic composite stiffness lump materials are mainly composed of steel, copper, alloys of resin and formed into a lump body having higher stiffness. The specific weight (net weight divided by the net volume) for such metallic composite stiffness lump materials is between about 2 and 6, equivalent to the specific weight of the generic metals.

On the other hand, the light weight flexible composite materials, which are represented by the housing body of a refrigerator or a washing machine, for example, are formed with steel and plastic, having metal plates with a thickness under 1 mm. Bodies of privately owned automobiles could also form the light weight flexible composite materials. Specifically, this light-weight flexible material is in the range of between 0.1 and 0.5.

Referring to FIG. 5, there is shown a supply station 60 for metallic composite stiffness lump materials, which are then fed to a cooling station 61 where they are cooled to improve their brittleness. These cooled parts indicated by arrow 61' are then led to the soft crushing station 62. These individual metallic composite stiffness materials each have a weight of between 5 Kg and 16 Kg and can be crushed in a moment into several pieces by the shock force of the hammers of the soft crushing station 62 (described in more detail below). Furthermore, due to the inner mechanical structure of the soft crushing apparatus 62, the individual forces developed by the mechanical crushing actions, include collision, screw, compression and some shearing actions. The combined integrated effects operate to complete the crushing operation within 5 to 6 seconds. These mechanical actions are applied continuously to each article placed under the crushing apparatus of station 62.

On the other hand, the light weight flexible composite materials from supply station 63 are fed to a coarse crushing station 64 at room temperature to be broken into relatively large pieces as described above with respect to the embodiment of FIG. 4. The coarsely crushed light weight flexible composite materials 64' are fed to the soft crushing station 62 in a ductile state at room temperature. There, the individual particles to be crushed are hit, torn off, and smashed by the sharp force of the hammers of the soft crushing station 62. Furthermore, due to the inner mechanical structure of the soft crushing apparatus, the volume of the individual pieces of the material 64' is reduced gradually in accordance with the applied force in response to the ductile nature of the thin plate, and finally its shape is reduced into a small-size ball like a fist. The actions taken for a housing body of a refrigerator, for example, is completed in 10 to 15 seconds in the soft crushing station 62.

The output of the soft crushing station 62 is provided as a mixture 65 which is further processed for recycling at stations 66 for light weight material separation, station 67 for metallic material separation, and station 68 for plastic material separation. A station 68, plastic materials composed of vinyl chloride are separated and indicated by arrow 68', and the residual plastic materials are separately recovered and indicated by the arrow 68".

Figure 6:
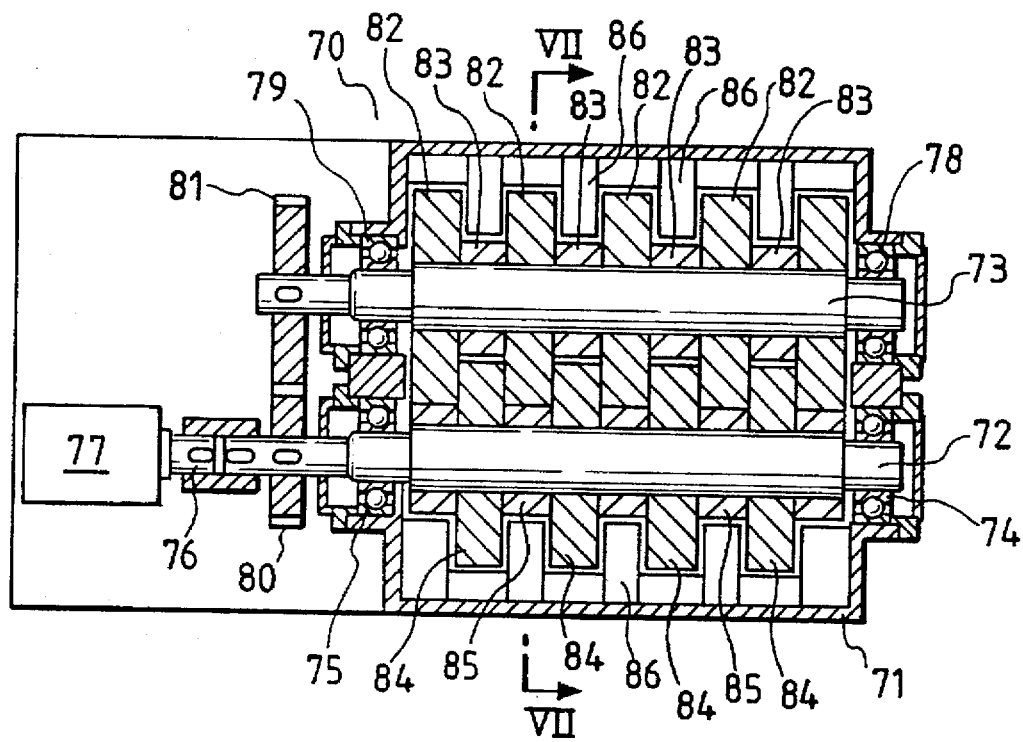
FIG. 6 is a horizontal cross-sectional schematic view showing an embodiment of a course crushing apparatus for use in the present invention.
Figure 7:
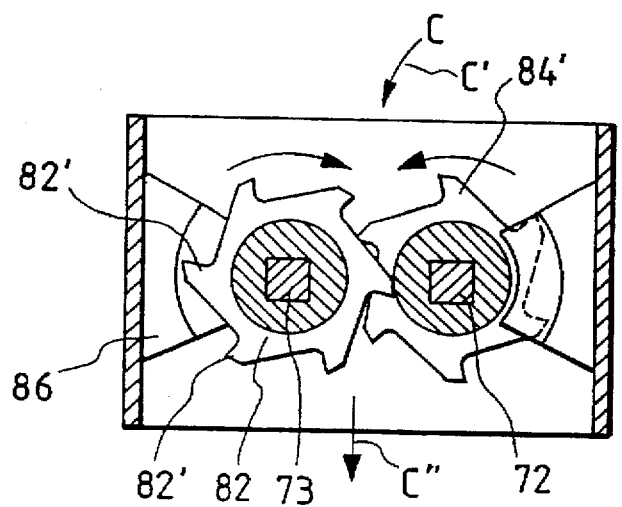
FIG. 7 is a part sectional view taken along line VII—VII of FIG. 6.

FIG. 6 is a horizontal cross-sectional schematic view of a coarse crushing apparatus of the type contemplated for the present invention for practicing the process described above with respect to FIGS. 4 and 5. The coarse crushing apparatus of FIG. 6 would correspond to station 48 in FIG. 4 and in FIG. 5 it would correspond to station 64. FIG. 7 is a sectional view along the line VII—VII of FIG. 6.

Referring to FIGS. 6 and 7, a coarse crushing device 70 is illustrated which includes a casing 71 which houses a pair of parallel rotating shafts 72 and 73. The shaft 72 is rotatably Supported at one end by a roller bearing assembly 74 and at the other end of the casing 71 by a roller bearing assembly 75. The shaft 72 is a main drive shaft which is connected by a coupling with a drive shaft 76 of an electric motor 77. The second shaft 73 is supported in the casing 71 by bearing assemblies 78 and 79. A flat gear 80 is fixed to the main drive shaft 72 to rotate therewith. Gear 80 is engaged with a gear 81 fixed on an end part of the sub-drive shaft 73. With this arrangement, when the motor 77 rotates the main drive shaft 72 in a clockwise direction, the sub-drive shaft 73 is rotated in the opposite counterclockwise direction. The relative directions of rotation of the shafts 72 and 73 are depicted by arrows in the FIG. 7 illustration.

Cutting blades 82, shaped like a disk, are mounted to be rotatable with the shaft 73 and are spaced from one another by spacers 83. In a corresponding manner, cutting blades 84 are rotated with the shaft 72 and are spaced from one another by spacers 85. The blades 82 and 84 and the spacers 83 and 85 are disposed so that during rotating operation of the shafts 72 and 73, adjacent cutting blades 82 and 84 have their axial side faces in immediate facing contact. On the cutting blades 82, a plurality of waved sharp edges 82' is formed at a constant circumferential interval and serve for cutting electrical appliance parts or component C fed from above as indicated by the arrow C' in FIG. 7. These waved sharp edges 82' of blades 82 cooperate with corresponding edges 84' on the cutting blades 84. During rotational movement of the cutting blades, outer ridges of individual waved sharp edges 82' and 84' extend with a very small gap with respect to outer ridges of the spacers on the adjacent other shaft, with this spacing held between 0.5 mm and 1 mm. In operation, the waved sharp edges 82', 84' contact the components C to be crushed upon rotation of these cutting blades and cut the components C with shearing action into pieces having a length equivalent to the thickness of the cutting blades and the interval of the cutting blade sharp edges. A pair of axial side faces of the cutting blades always practically contact each other for form a slit cutter and the waste component C supplied from above the casing 71 is caught by the sharp edges 82' and 84' and crushed by the shearing action of the slit cutter and finally discharged downwardly as depicted by the arrow C'" in FIG. 4. Additionally, scrapers 86 are placed at a position facing the cutting blades 82, 84 and their waved sharp edges 82', 84', with the outer periphery of the scrapers 86 shaped in a partial circular arc so as to meet the locus of the cutting blades and the spacers. The scrapers 86 scrape off the crushed pieces of the components C' which otherwise is adhered between the cutting blades.

In an experiment using the coarse crushing device 70 of FIGS. 6 and 7, in order to obtain coarsely crushed pieces dimensioned between 50 mm and 160 mm mean diameter, it was provided that the width of the cutting blades in the axial direction of the shafts is between 50 mm and 100 mm, and the diameter of the cutting blades is between 450 mm and 750 mm. In especially preferred embodiments, the width of the cutting blades is about 75 mm, the diameter of the cutting blades is about 650 mm, and the number of waved sharp edges on each blade is 6. A housing body of a refrigerator or the like composed of composite materials, including various metals and plastic resins, is crushed by the coarse crushing device 70 with mostly simple shearing action and without any twist or distortion action. A component composed of a single material is crushed as it is without mixing with other materials, and composite members composed of a plurality of materials is crushed without complex mixing of composite materials.

Figure 8:
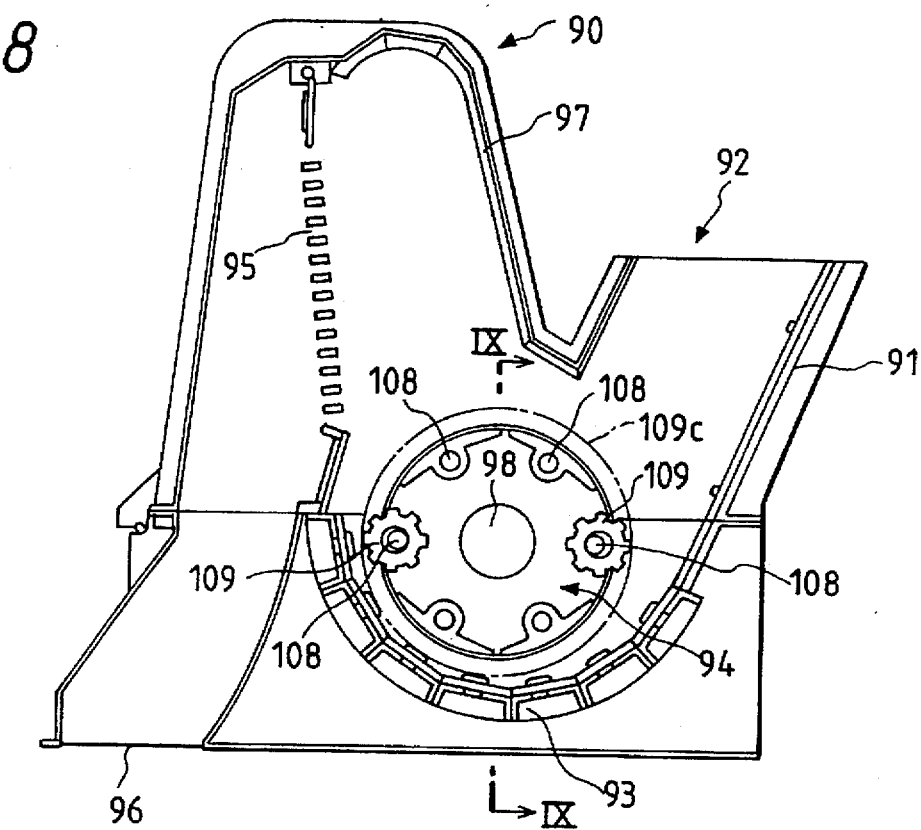
FIG. 8 is a schematic part sectional view of a soft crushing apparatus according to a preferred embodiment of the present invention.
Figure 9:
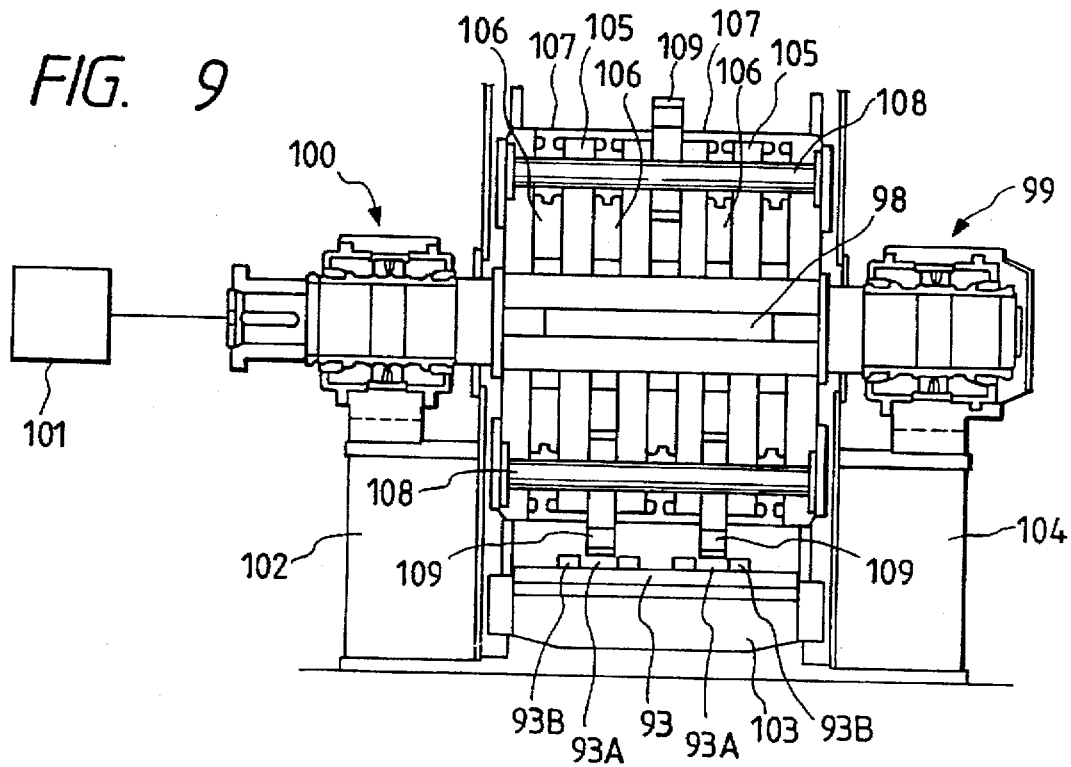
FIG. 9 is a side schematic sectional view of the soft crushing apparatus of FIG. 8.

FIGS. 8 and 9 schematically depict an embodiment of a soft crushing machine or device 90, which soft crushing machine is used to carry out the soft crushing processes depicted at 47 in FIG. 4 and 62 in FIG. 5. FIG. 8 is a front schematic sectional view of the soft crushing device 90, and FIG. 9 is a side sectional view taken along line IX—IX of FIG. 8. The soft crushing machine 90 is configured as a specially designed hammer mill assembly which has a casing 91 defining a processing chamber with an inlet opening 92 for components from the previous coarse crushing step discussed above in connection with station 48 of FIG. 4 and station 64 of FIG. 5. The casing 91 includes a crush plate assembly 93 extending below a rotatable hammer mill assembly 94. Upwardly of the crush plate assembly 94 on the left side of the casing 91, there is provided a screen 95 for permitting discharge of small particles by way of discharge opening 96. Opposite the screen 95, a collision plate assembly 97 is provided. In operation, small crushed particles or flakes passed through screen 95 are discharged out of the crusher through the discharge opening 96. Larger crushed particles or flakes not passed through the screen 95 are rebounded and returned to the rotatable hammer mill assembly to repeat crushing with the hammer until the particles pass through the screen 95.

A main drive shaft 98 is provided which is rotatably supported by roller bearing assemblies 99 and 100 at opposite ends of the casing 91. The main drive shaft 98 is coupled to an electric motor 101 which rotatably drives the same at high speeds during crushing operations. The bearing assemblies and the casing are supported at a machine frame assembly 102, 103, 104 to provide a stable support for the entire assembly, and especially the rotating hammer mill assembly 94 and crush plate assembly 93.

A plurality of disks are supported on the main drive shaft 98 for rotation therewith. These disks 105 are separated by spacing collar assemblies 106 which have ring plates 107 at their radial outer ends which together form a ring plate assembly extending circumferentially around the spacing collars 106, except for locations for the radial protrusion of hammer members described in more detail below.

Hammer supporting rods 108 are mounted and supported in the disks 105 and extend axially and parallel to the main drive shaft 98 at a location near the radial outer ends of the disks 105, but radially inwardly of the surrounding ring plates 107. One or more hammer members 109 are mounted on each of the hammer support rods 108, with a central opening in the hammer member being circular and larger than the diameter of the respective hammer support rod 108 so as to permit limited radial movement of the hammer member during rotating operations of the main drive shaft 98. In operation for crushing articles with the motor 101 rotating the main drive shaft 98 at high speed, and consequent high speed rotation of the hammer mill assembly 94, including the hammer support rods 108, the hammer members 109 are moved radially outside by centrifugal force. When these hammer members 109 collide with material being crushed, the rotational movement of the hammer members is disturbed largely by kickback action. In preferred embodiments, the maximum distance allowable for the kickback action is so determined to be about 100 mm, by appropriate dimensioning of the diameter of the hammer support rod and the diameter of the holes formed in the hammer members. The ring plate members making up the ring plate 107 are provided with mounting holes having a diameter slightly greater than the diameter of the hammer support rods in order to facilitate small movements in the gap between the disks 105 and the hammer members 109. With this arrangement, the mechanical impact is moderated which is produced at the time when the objects to be crushed are caught between the ring plates 107 and the crushed plate assembly 93. Accordingly, this arrangement prevents failure at the attaching points for these parts.

With this structural configuration, the rotor assembly formed by the rotor shaft, support disks, hammer support rods, and ring plates, has an outer circumferential configuration which substantially is occupied by the ring plates and the hammer members.

At the lower portion of the casing 91, the crush plate assembly 93 is provided, which has a plurality of alternating concave sections 93A and convex sections 94B, as viewed in the direction parallel to the axis of the drive shaft 98. As can best be seen in FIG. 9, the hammer members 109 are disposed so as to face the concave sections 93A and the convex sections 94B are disposed in facing relationship to respective spacing disks 105.

In order to provide for the soft crushing action, with minimal shearing forces on the components being processed, the geometrical relationship of the hammer members 109 and the crush plate assembly 93, 93A, 93B is selected for a preferred practical embodiment as described below in conjunction with FIGS. 8B and 9B.

Figure 8B:
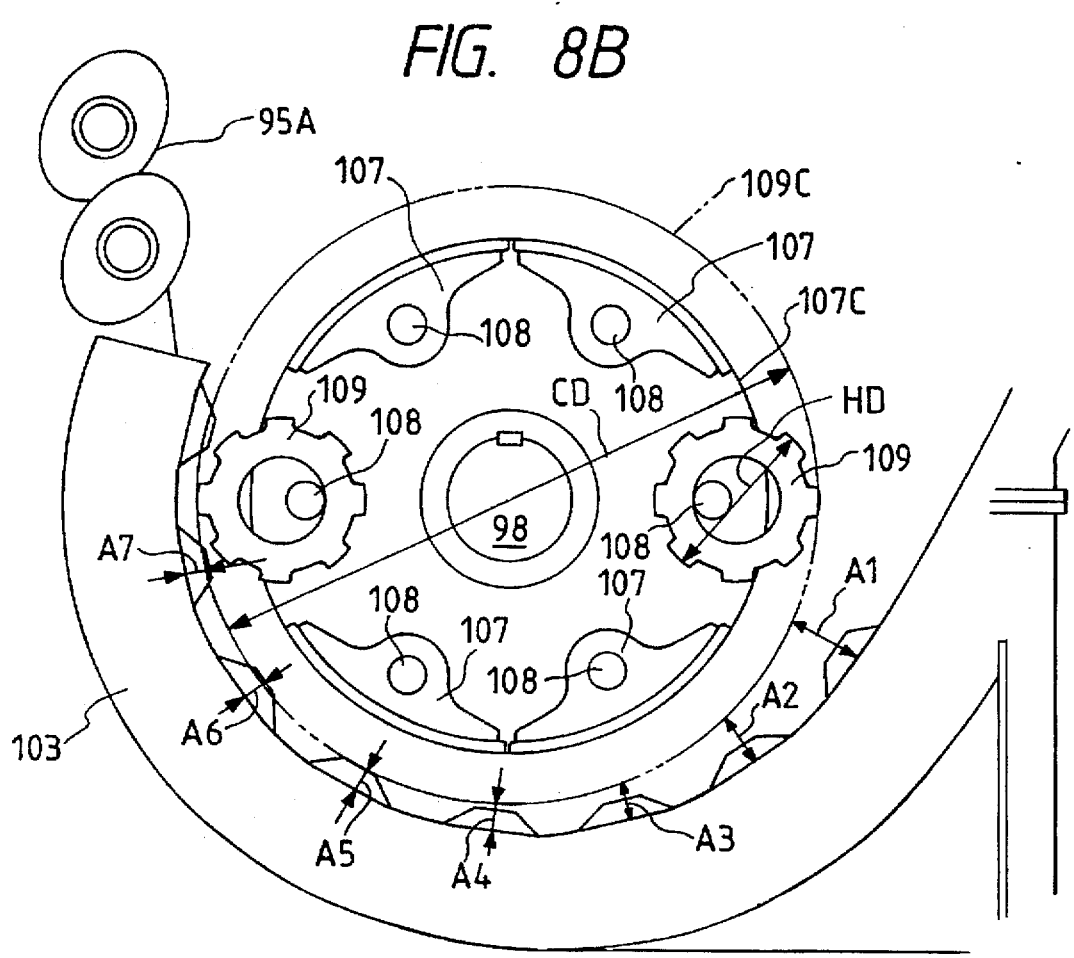
FIG. 8B is an enlarged schematic sectional view of a portion of FIG. 8, showing further details.
Figure 9B:
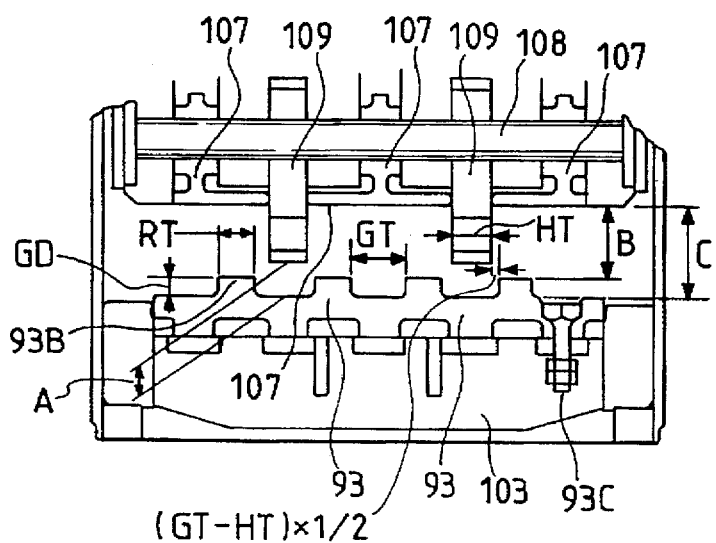
FIG. 9B is an enlarged view of portions of FIG. 9 showing further details.

In FIGS. 8B and 9B the reference characters depicting dimensions are as follows:

CD—diameter of circle 109C=1520 mm

HD—diameter of hammer member 109=400 mm

HT—axial thickness of hammer member 109=80 mm

RT—axial thickness of convex section 93B=70 mm

GT—axial thickness of concave section 93A=120 mm

GG—½ of difference GT−HT=20 mm

GD—depth of concave section 93A=40 mm

A (A1−A7)—spacing from circle 109C to bottom of 93A=variable

The dimensions A reduce substantially continuously and increasingly in the direction from the inlet position A1 to the closest spacing A7, A1=170 mm and A7=25 cm.

These dimensions are given by way of practical example and should not be considered as excluding other dimensional arrangements. What is important is the provision of substantial gaps between the hammers and the crushed plate assembly so as to avoid substantial shearing effects.

By establishing the gaps between the radial outer ends of the travel path at the hammer members and the crush plate assembly 93, it is prevented that the grain size of articles crushed becomes too small. In operation with the soft crush hammer mill device described, the size of the crushed articles is maintained substantially above 5 mm mean diameter. These 5 mm and less grain sizes make up 10% or less of the total material being processed in the soft crush hammer mill. These small grain size particles are removed through the screen 95 and are considered to be dust which cannot be economically recycled, and therefore are finally moved to a landfill or the like. In FIG. 8B an alternative adjustable screen 95H is depicted. Using the soft crushing apparatus, the crushed articles having a size greater than 5 mm mean diameter can be effectively recovered in downstream operation.

Since the soft crushing hammer mill assembly 90 does not have a crushing mechanism using shearing action as used ordinarily in prior art systems, composite materials are not crushed or cut up into small size pieces without initiating separation of composite materials. With the soft crushing mechanism, the mid-sized and small-sized crushed pieces are processed with mechanical interaction forces, including shock action, by collision between the hammers and bounding from the collision plate 97, and these mechanical interactions are done primarily in the gap between the crush plate and the rotor assembly with the rotating hammers. Due to the configuration with the gaps between the crush plate and hammer members, tension forces are applied to separate or at least partially separate the materials along their connection planes (see FIG. 3B above), thus improving the recycling recovery percentages in downstream processes.

In the soft crushing apparatus described, flexible materials composed of resin and plastic are never crushed excessively into small-sized particles. Brittle material such as glass and metallic particles that may be cooled to increase their brittleness are crushed into small particles not by shearing action, but rather by shock action, with improved separation. Ductile materials such as steel plates are deformed non-elastically and shaped in a ball-like fist with a designated size to be eventually discharged. On the other hand, the metallic composite stiffness lump materials are cooled down to a low temperature, and the steel and iron members become transformed into a brittle state and broken into small pieces by the shock action, and hence shearing action is not necessary. As copper and aluminum, which do not change into brittle property in low temperature, have lower mechanical strength and malleable property, members including these metals can be crushed by the mixed and integrated mechanical interactions without requiring shearing actions.

By separating and recovering electrical appliances and the like as described herein, in addition to the recovery of metallic materials, plastic materials can be separated and recovered for recycling on an efficient basis, and therefore the volume of material to be eventually placed in landfills and the like can be reduced.

Since by using the process and system of the present invention, almost all parts of large size electrical appliances and the like can be recovered and used for recycling resources, global resources can be economically used. In addition, the volume of unrecyclable dust becomes extremely small. Furthermore, incinerating processing is not necessary for most of the material being recycled.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of recycling electric home appliances including plastic material attached to metal parts, comprising:

soft crushing parts of appliances with reduced shearing action and resulting peeling of plastic material from metal parts to produce a mixture of crushed metal parts and crushed plastic parts separated from one another, said soft crushing producing dust size particles with a mean diameter of 5 mm and less that are no more than 10% of total material soft crushed to thereby reduce formation of unrecyclable dust size particles, and subsequently recovering individual components from said crushed metal parts and crushed plastic parts other than said dust size particles.

2. A method according to claim 1, wherein said soft crushing is performed in a hammer mill with gaps between movable hammer members and fixed crush plate portions facing the hammer members, said gaps being selected to be at least 5 mm in size.

3. A method according to claim 1, wherein said soft crushing is performed in a hammer mill comprising:

a casing defining an inlet opening and an outlet opening, a crush plate assembly along one side of the casing, a rotatably driven rotor shaft extending along a rotor shaft axis, hammer support rods extending parallel to and at a radial distance from the rotor shaft, said hammer support rods being connected to and movable with the rotor shaft, hammer members supportably mounted on the hammer support rods by way of central openings in the hammer members having a diameter larger than the diameter of the hammer support rods, whereby the hammer members rotate with the rotor shaft and engage portions of appliances fed into the inlet opening to crush the same between the crush plate assembly and hammer members upon rotation of the rotor shaft, said hammer members extending radially outward of a plate assembly rotating with the rotor shaft by a hammer axial extent during operation at operation speed of the rotor shaft, said crush plate assembly and hammer members being configured and positioned so that the minimum spacing between the hammer members and the crush plate assembly is 5 mm.

4. A method according to claim 3, wherein said minimum spacing is between 5 mm and 60 mm.

5. A method according to claim 3, wherein said crush plate assembly includes alternating concave and convex regions along its axial extent parallel with the rotor axis, wherein said radial outer ends of hammer members are spaced radially from respective facing concave regions of the crush plate assembly, wherein said respective hammer members are disposed centrally of respective facing concave regions of the crush plate assembly, and wherein the minimum spacing between a radial outer tip of the hammer member and the facing concave region of the plate assembly is between 25 mm and 170 mm.

6. A method according to claim 5, wherein said concave regions are approximately 40 mm deep in the radial direction as compared to the convex regions.

7. A method according to claim 5, wherein the radial extent of the hammer members protruding radially outside of a ring surface is approximately 80 mm and the radial extent of a corresponding facing concave region of the crush plate assembly is approximately 120 mm at certain relative rotative positions of the rotor shaft and crush plate assembly.

8. A method according to claim 3, wherein a screen is provided on the casing for permitting removal of small size particles with a mean diameter of under 5 mm.

9. A method according to claim 1, comprising the following steps prior to said soft crushing:

supplying appliances to be processed;

extracting fluids from the appliance;

extracting heavy-weight metallic composite stiffness lump materials from the appliances; and cooling the extracted lump materials to a designated temperature to increase brittleness thereof.

10. A method according to claim 9, wherein said subsequently recovering individual components includes separating the output from the soft crushing step into metallic and non-metallic materials.

11. A method according to claim 9, comprising coarse crushing the parts before said soft crushing step.

12. A method according to claim 11, wherein said coarse crushing is performed in a hammer mill type machine including:

a plurality of cutting blades which each has a plurality of edges and is fixed on a main rotatable drive shaft, adjacent cutting blades axially facing one another, wherein each cutting blade has a width between 15 mm and 100 mm, wherein each cutting blade has a diameter between 450 mm and 750 mm, wherein between 4 and 8 cutting blades are provided on said main drive shaft, and wherein said cutting blades are operable to coarsely crush the light-weight composite flexible material by applying primarily shearing actions thereto.

13. A method according to claim 11, wherein said coarse crushing is performed in a coarse crushing apparatus including:

a plurality of cutting blades which each has a plurality of cutting edges and is mounted on a main drive shaft and a parallel extending sub-drive shaft, with respective cutting blades of the two shafts axially facing one another, wherein a width of each cutting blade is between 60 mm and 80 mm, wherein a diameter of said cutting blades is between 600 mm and 700 mm, wherein the total number of said cutting blades is 6, and wherein said cutting blades are operated to coarsely crush by applying primarily a shearing action.

14. A method according to claim 1, wherein said soft crushing is performed in a hammer-mill type device, including:

a plurality of disks spaced at a constant spacing from one another by distance collars on a main drive shaft, a plurality of hammer rods carried by the disks and supporting hammer members having holes with a diameter larger than the diameter of the respective hammer rod and enclosing same, a ring plate having a mounting hole with diameters slightly larger than diameters of said hammer rods for accommodating movement of the hammer rods in a small displacement, a ring blade assembly forming a rotor configuration with said hammers protruding radially therefrom, wherein said main drive shaft is mounted with a bearing in a casing, a crush plate having a plurality of convex and concave shaped surfaces provided in a bottom part of the casing, said crush plate being formed so that a part where said hammer passes is a concave shape and a part where said hammer does not pass is a convex shape, a minimum gap between said hammer and said concave part being over 5 mm and under 60 mm, and a gap between said ring plate where said hammer does not pass a convex part being over 5 mm and under 600 mm, and a collision plate placed in an upper part of said casing, a screen being placed opposite said collision plate, and a discharge port for crushed pieces placed outside said screen.

15. A method according to claim 1, wherein said soft crushing is performed in a hammer mill comprising:

a casing defining an inlet opening and an outlet opening, a crush plate assembly along one side of the casing, a rotatably driven rotor shaft extending along a rotor shaft axis, hammer support rods extending parallel to and at a radial distance from the rotor shaft, said hammer support rods being connected to and movable with the rotor shaft, hammer members supportably mounted on the hammer support rods by way of central openings in the hammer members having a diameter larger than the diameter of the hammer support rods, whereby the hammer members rotate with the rotor shaft and engage portions of appliances fed into the inlet opening to crush the same between the crush plate assembly and hammer members upon rotation of the rotor shaft, said hammer members extending radially outward of a plate assembly rotating with the rotor shaft by a hammer axial extent during operation at operation speed of the rotor shaft, wherein said crush plate assembly includes alternating concave and convex regions along its axial extent parallel with the rotor axis, wherein radial outer ends of the hammer members are spaced at a radial spacing from respective facing concave regions of the crush plate assembly during operation of the hammermill, wherein said respective hammer members are disposed centrally of respective facing concave regions of the crush plate assembly, and are spaced at an axial spacing from respective convex regions adjoining respective concave regions, and wherein the minimum radial spacing between a radial outer tip of the hammer member and the facing concave region is between 25 mm and 170 mm and the minimum axial spacing between the respective hammer member and the respective convex regions adjoining a respective concave region is greater than 5 mm, whereby the soft crusher is configured to produce dust size particles with a mean diameter of 5 mm and less that are no more than 10% of total material soft crushed to thereby reduce formation of unrecyclable dust size particles.

* * * * *